(12) United States Patent
Yuan

(10) Patent No.: US 10,787,344 B2
(45) Date of Patent: Sep. 29, 2020

(54) TROLLEY ASSEMBLY INCLUDING A TRAVELING CONTROL SYSTEM

(71) Applicant: Fuchun Yuan, Beijing (CN)

(72) Inventor: Fuchun Yuan, Beijing (CN)

( * ) Notice: Subject to any disclaimer, the term of this patent is extended or adjusted under 35 U.S.C. 154(b) by 112 days.

(21) Appl. No.: 16/159,529

(22) Filed: Oct. 12, 2018

(65) Prior Publication Data
US 2019/0112164 A1     Apr. 18, 2019

Related U.S. Application Data

(60) Provisional application No. 62/571,351, filed on Oct. 12, 2017.

(51) Int. Cl.
| | |
|---|---|
| *B60P 3/40* | (2006.01) |
| *B66C 11/24* | (2006.01) |
| *B60P 1/16* | (2006.01) |
| *B60P 1/64* | (2006.01) |
| *B65G 67/12* | (2006.01) |

(52) U.S. Cl.
CPC .............. *B66C 11/24* (2013.01); *B60P 1/162* (2013.01); *B60P 1/6463* (2013.01); *B60P 3/40* (2013.01); *B65G 67/12* (2013.01)

(58) Field of Classification Search
CPC ........ B66C 11/24; B60P 1/162; B60P 1/6463; B60P 3/40; B65G 67/12

USPC .......................................................... 701/50
See application file for complete search history.

(56) References Cited

U.S. PATENT DOCUMENTS

| | | | | |
|---|---|---|---|---|
| 4,706,317 | A * | 11/1987 | Horstketter | E01D 21/00 14/77.1 |
| 5,947,308 | A * | 9/1999 | Markelz | B66C 23/50 104/2 |
| 9,879,457 | B1 * | 1/2018 | Weldon | E05D 15/0617 |

* cited by examiner

*Primary Examiner* — Gertrude Arthur Jeanglaude
(74) *Attorney, Agent, or Firm* — Nan Jiang; Dickinson Wright PLLC

(57) ABSTRACT

A tire trolley assembly comprises a frame having a pair of supports including a first and a second support extending between a first and a second end. A connector is disposed at the first and the second end, attached to the support, extending between a primary end adjacent to the frame and a secondary end spaced from the frame. A plurality of wheels includes a first and a second wheel attached to the connector. A plurality of mounting members, including a first mounting member rotatably attached to the first wheel and coupled to the connector and a second mounting member rotatably attached to the second wheel and coupled to the connector. A traveling control system controls and steers the wheels of the tire trolley assembly.

14 Claims, 3 Drawing Sheets

TROLLEY ASSEMBLY INCLUDING A TRAVELING CONTROL SYSTEM

CROSS REFERENCE TO RELATED APPLICATION

This application claims the benefit of U.S. Provisional Patent Application Ser. No. 62/571,351 filed on Oct. 12, 2017, the entire disclosure of which is incorporated herein by reference in its entirety.

BACKGROUND OF THE INVENTION

1. Field of the Invention

The present invention generally relates to a trolley assembly and, more specifically, a trolley assembly including a traveling control system for transporting precast beams of bridges.

2. Description of the Prior Art

In construction, precast beam bridges are becoming increasingly popular. More and more highway and railway bridges are being constructed using precast beams. When using precast beams to construct a bridge, different types of precast beams (full span box beam, segment box beam, T-shaped beam, I-shaped beam, etc.) are made from beam yard. Next, the precast beams are transported to the bridge end with a tire trolley assembly and erected using a machine, e.g. a crane or a gantry. The distance between the beam yard and the bridge varies between less than 10 km to greater than 10 km. Due to the long distance of transportation, the tire trolley assembly often takes a longer to travel to the construction site. Because operators manually operate the tire trolley, the long distance often require high labor strength from the operators.

Often, during the transport of the precast beams, the operators tend to become fatigued due to long hours of work. In addition, the allowable deviation of the central line of the tire trolley assembly from the central line of travel is very small which require high steering operation precision and constant observation made by the operator. Since the operator can be easily fatigued, this will tends to result in possible safety risks to the working personnel and equipment.

One such a trolley assembly is disclosed in U.S. Patent Application 2016/0229326. The trolley assembly includes a frame. A plurality of wheels, including a first wheel and a second wheel, are attached to the connector for movement along a surface to transport the frame. The frame includes a plurality of range sensors for detecting the surroundings of the frame.

SUMMARY OF THE INVENTION

The present invention provides a tire trolley assembly that reliefs operator from fatigue, ensures steering precision, and provides improved operation safety of the trolley assembly. The tire trolley assembly, for transporting a precast beam of a bridge along a road including a barrier extending along both sides of the road, includes a frame. The frame includes a pair of supports having a first support and a second support. Each one of the supports extends between a first end and a second end for receiving and transporting the precast beam. A connector, disposed at the first end and the second end, is attached to the support. The connector extends between a primary end and a secondary end. The primary end is adjacent to the frame. The secondary end is spaced from the frame. A plurality of wheels, including a first wheel and a second wheel, are attached to the connector for movement along a surface to transport the frame and the precast beam. A plurality of mounting members, including a first mounting member and a second mounting member, extends between the wheel and the connector to couple the wheels with the connector. The first mounting member is rotatably attached to the first wheel and coupled to the connector. The second mounting member is rotatably attached to the second wheel and coupled to the connector. A traveling control system for monitoring a gap between the frame and the barrier of the road to determine a central line and a line of travel of the frame. The traveling control system also determines a deviation between the central line and the line of travel. The traveling control system defines a nominal distance and an alarming distance and a maximum distance whereby:

a) in response to the deviation being less than the nominal distance, the tire trolley assembly travels along the road without any steering;

b) in response to the deviation being greater than or equal to the nominal distance but less than the alarming distance, the tire trolley assembly travels along the road and the cylinder adjusts the wheels to steer the tire trolley assembly to a position with the deviation being less than the nominal distance;

c) in response to the deviation being equal to or greater than the alarming distance but less than the maximum distance, the tire trolley assembly travels along the road and the cylinder adjusts the wheels to steer the tire trolley assembly to the position with the deviation being less than the nominal distance; and d) in response to the deviation being equal to or greater than the maximum distance, operation of the tire trolley assembly stops immediately.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
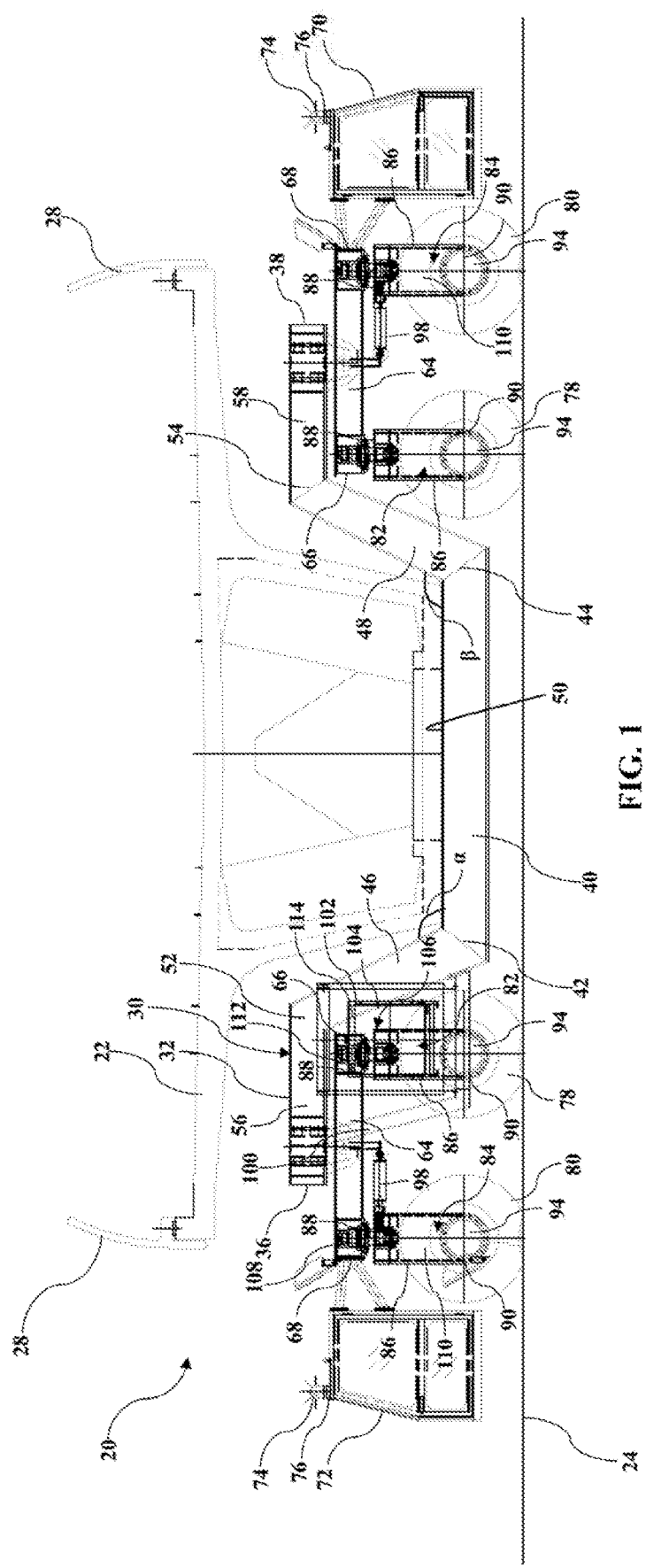
FIG. 1 a side view of the tire trolley assembly in accordance with one embodiment of the present invention.

Referring to the Figures, wherein like numerals indicate corresponding parts throughout the several views, a tire trolley assembly 20 constructed in accordance with one embodiment of the present invention is generally shown in FIG. 1. Typically, the tire trolley assembly 20 is used for transporting a precast beam 22 of a bridge along a road 24 or a second precast beam 26. The road 24 and the second precast beam 26 include a barrier 28 disposed on both sides of the road 24 or the second precast beam 26.

The tire trolley assembly 20 includes a frame 30 for receiving and transporting the precast beam 22. The frame 30 includes a pair of supports 32, 34 having a first support 32 and a second support 34. The supports 32, 34 are spaced from one another with each of the supports 32, 34 extends between a first end 36 and a second end 38. Each of the supports 32, 34 includes a base 40 extending between a first base end 42 and a second base end 44. A pair of arms 46, 48, spaced from one another, extends outwardly and upwardly from the base 40 to define a chamber 50 between the arms 46, 48 and the base 40 for receiving the precast beam 26. The pair of arms 46, 48 includes a first arm 46 and a second arm 48. The first arm 46 is connected to the base 40 at the first base end 42 and extends outwardly and upwardly from the first base end 42 at a first angle α of greater than 90° relative to the base 40 to a first arm end 52. The second arm 48 is connected to the base 40 at the second base end 44 and extends outwardly and upwardly from the second base end 44 at a second angle β of greater than 90° relative to the base 40 to a second arm end 54. A pair of beams 56, 58 is attached to the arms 46, 48 and extends outwardly from the arms 46, 48 in a direction opposite of one another and parallel to the base 40. The pair of beams 56, 58 includes a first beam 56 and a second beam 58. The first beam 56 is attached to the first arm end 52 and extends outwardly from the first arm end 52 parallel to the base 40 to the first end 36. The second beam 58 is attached to the second arm end 54 and extends outwardly from the second arm end 54 in a parallel relationship with the base 40 to the second end 38.

Figure 2:
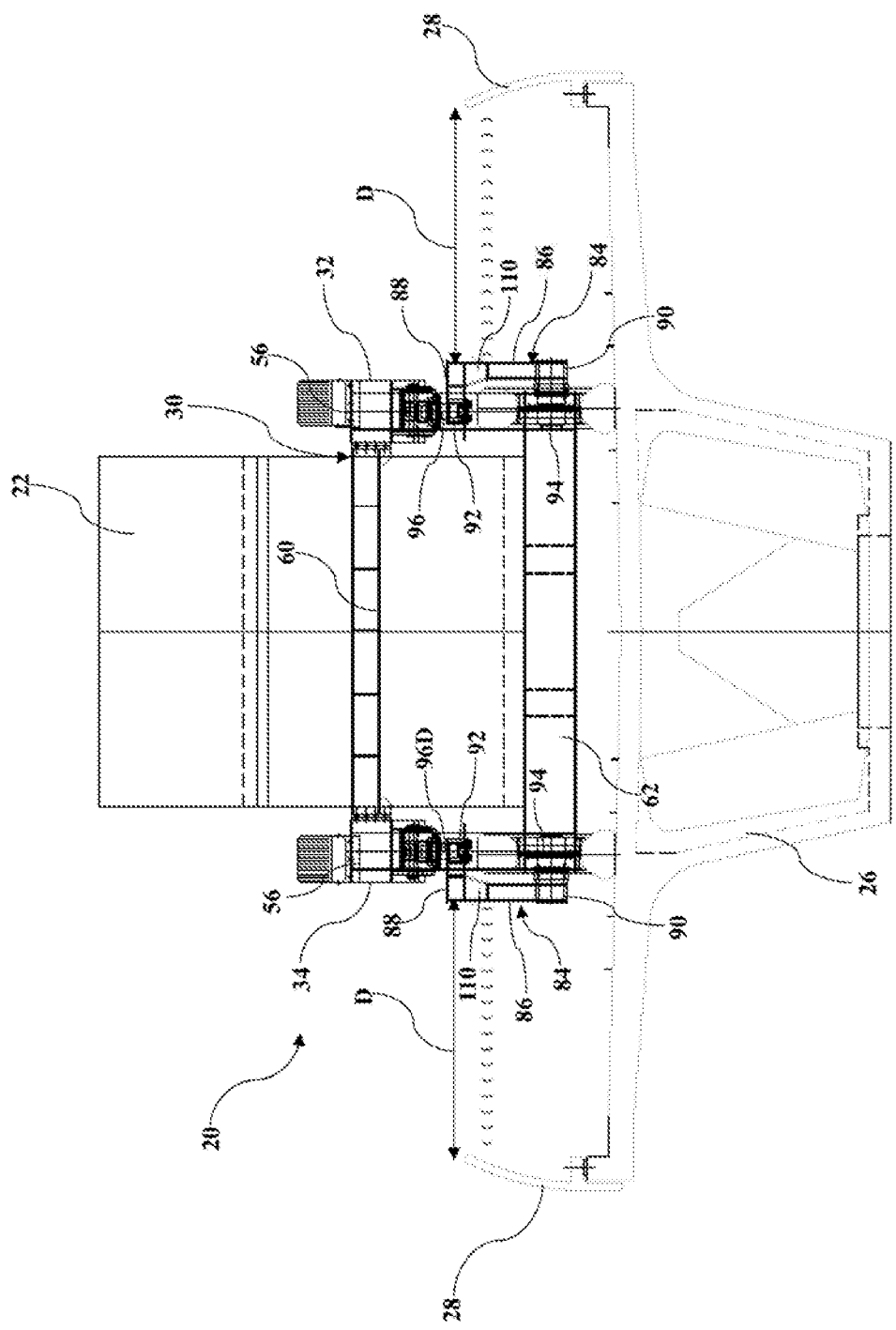
FIG. 2 is a front view of the tire trolley assembly.
Figure 3:
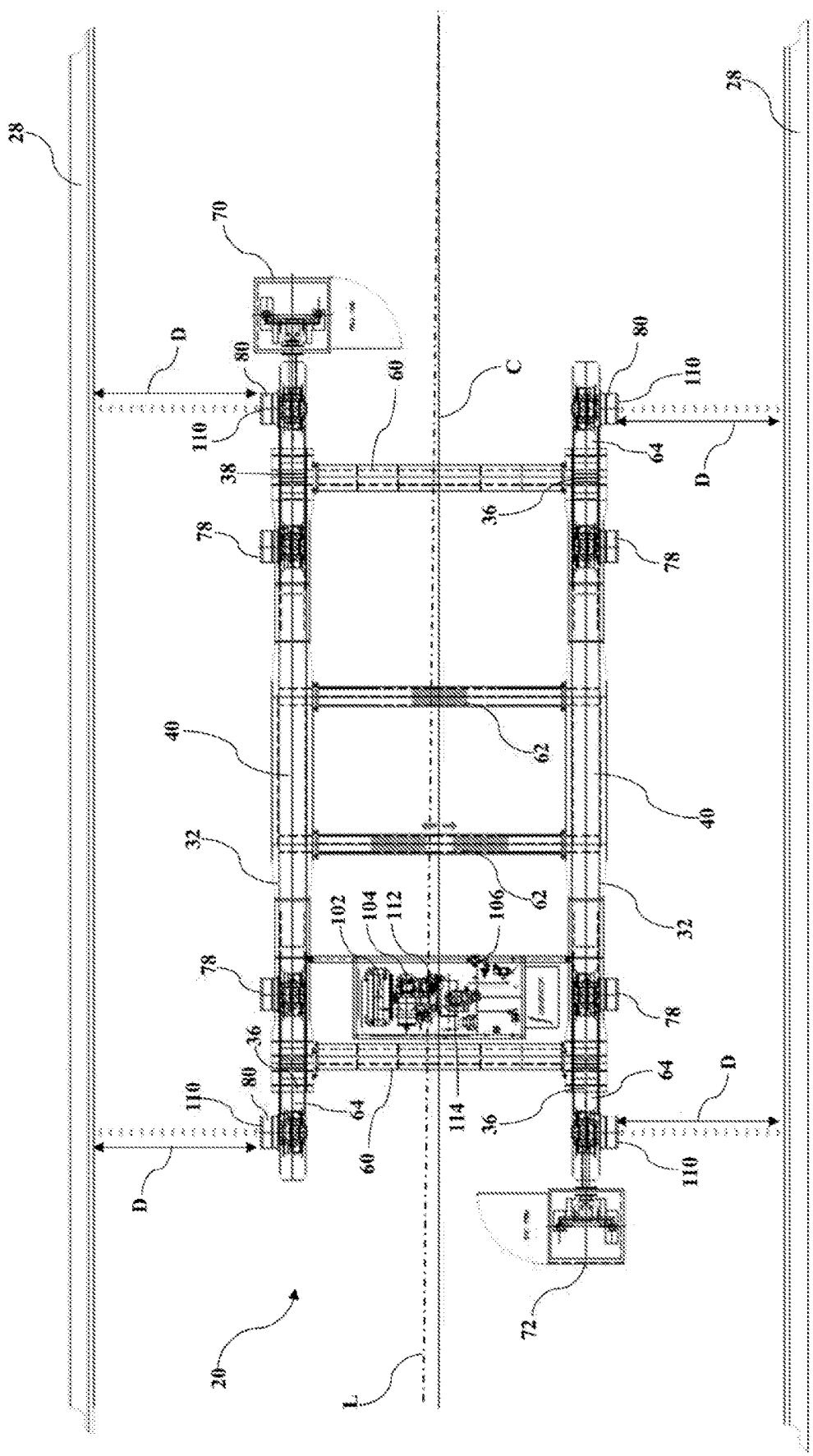
FIG. 3 is a top view of the tire trolley assembly.

As best shown in FIGS. 2 and 3, a pair of linking members 60, spaced from one another, with one of the linking members 60 being disposed at the first end 36 and another one of the linking members 38 being disposed at the second end 38 of the supports 32, 34. The linking members 60 extend perpendicularly between the supports 32, 34 to connect the supports 32, 34 with one another. A pair of intermediate members 62, spaced from one another, extends between the base 40 of the supports 32, 34 perpendicularly to the base 40 of the supports 32, 34 to connect the supports 32, 34 to one another. It should be appreciated that the linking members 60 and the intermediate members 62 can be telescopic for adjusting spacing between the supports 32, 34 to accommodate for precast beams 22 having different sizes.

As illustrated in FIG. 1, a connector 64 is disposed at the first end 36 and the second end 38 of the supports 32, 34 and attached to the supports 32, 34. The connector 64 extends parallel to the base 40 between a primary end 66 and a secondary end 68. The primary end 66 is disposed adjacent to the arms 46, 48 of the supports 32, 34. The secondary end 68 is longitudinally spaced from the supports 32, 34.

As best shown in FIG. 3, a plurality of cabins 70, 72 attached to the frame 30 to allow an operator to control the tire trolley assembly 20. The cabins 70, 72 includes a first cabin 70 and a second cabin 72 with the first cabin 70 being disposed at the second end 38 of the first support 32 and attached to the secondary end 68 of the connector 64 to allow an operator to control the tire trolley assembly 20. The second cabin 72 is disposed at the first end 36 of the second support 34 and attached to the secondary end 68 of the connector 64 to allow the operator to control the tire trolley assembly 20 in the second cabin 72. It should be appreciated that the first cabin 70 allows the operator to control a first direction of travel of the tire trolley assembly 20 while the second cabin 72 allows the operator to control a second direction of travel of the tire trolley assembly 20 that is in an opposite direction than the first direction of travel. It should also be appreciated that the cabins 70, 72 can include an indicator light 74 and speakers 72 for alarming the tire trolley assembly's 20 surroundings and the operator.

A plurality of wheels 78, 80 is attached to the connector 64 for movement along the road to transport the frame 30 and the precast beam 26. The plurality of wheels 78, 80 includes a first wheel 78 and a second wheel 80 with the first wheel 78 being attached to the primary end 66 of the connector 64 and the second wheel 80 being attached to the secondary end 68 of the connector 64. It should be appreciated that the first wheel 78 and the second wheel 80 can be attached to the connector 64 at any point along the connector 64. A plurality of mounting members 82, 84, including a first mounting member 82 and a second mounting member 84, extending between the wheels 78, 80 and the connector 64 to couple the wheels 78, 80 to the connector 64. The first mounting member 82 is rotatably attached to the first wheel 78 and coupled to the primary end 66 of the connector 64. The second mounting member 84 is rotatably attached to the second wheel 80 and coupled to the secondary end 68 of the connector 80. The mounting members 82, 84, each having a generally C-shape, include a body 86 extending between a first body end 88 and second body end 90. The first body end 88 is disposed adjacent to the connector 64 and the second body end 90 is disposed adjacent to the wheels 78, 80. A leg 92 is disposed at the first body end 88 and extends outwardly from the body 86 toward the wheels 78, 80. A shaft 94 is disposed at the second body end 90, extending outwardly from the body 86 toward the wheels 78, 80 and through the wheels 78, 80 to allow the wheels 78, 80 to rotate about the shaft 94 along the road for transporting the frame 30 and the precast beam 22. A protrusion 96 extends outwardly from the leg 92, toward the connector 64, and is coupled to the connector 64 for allowing the mounting member 82, 84 and the wheels 78, 80 to rotate about the connector 64 for adjusting a direction of travel for the tire trolley assembly 20.

A cylinder 98 is attached to the connector 64 and the second mounting member for rotating the second mounting member 84 and the second wheel 80 about the connector 64 to steer the frame 30 of the tire trolley assembly 32. The cylinder 98 is disposed between the primary end 66 and the secondary end 68 of the connector 64 and attached to the connector 64. The cylinder 98 extends parallel along the connector 64, toward the secondary end 68, and is attached to the second mounting member 84 for rotating the second mounting member 84 and the second wheel 80 relative to the connector 64 to steer the frame 30. It should be appreciated that, in alternative embodiment of the present invention, the cylinder 98 can extend parallel along the connector 64, toward the first end 68, and attached to the first mounting member 84 for rotating the first mounting member 84 and the first wheel 80 relative to the connector 64 to steer the frame 30. A casing 100, having a generally L-shape cross-section, is attached to the frame 30 at the first ends 36 of the supports 32, 34 and the first arm 46. An engine 102 is disposed on the casing 100 for providing power to the wheels 78, 80 for transporting the preacast beam 22. A hydraulic power unit 104 is disposed adjacent to the engine 102 and connected to the cylinder 98 for providing a hydraulic power to the cylinder 98 to allow the cylinder 98 to actuate the second mounting member 84 for steering the frame 30 of the tire trolley assembly 20.

The tire trolley assembly 20 includes a traveling control system 106 for monitoring a gap D between the frame 30 and the barrier 28 of the road 24 or the second precast beam 26 to determine a central line C and a line of travel L of the frame 30. In addition, the traveling control system 106 also determines a deviation between the line of travel L and the central line C. The traveling control system 106 further defines a predetermined a nominal, an alarming, and a maximum distances whereby:

a) in response to the deviation being less than the nominal distance, the tire trolley assembly 20 travels without any steering;

b) in response to the deviation being greater than or equal to the nominal distance but less than the alarming distance, the tire trolley assembly 20 travels and the cylinder 98 adjusts the second wheel 80 to steer the tire trolley assembly 20 to a position with the deviation being less than the nominal distance;

c) in response to the deviation being equal to or greater than the alarming distance but less than the maximum distance, the tire trolley assembly 20 travels and the cylinder 98 adjusts the second wheel 80 to steer the tire trolley assembly 20 to the position with the deviation being less than the nominal distance; and d) in response to the deviation being equal to or greater than the maximum distance, operation of the tire trolley assembly 20 stops immediately.

As best illustrated in FIGS. 1 and 3, the traveling control system 106 includes an angle sensor 108 disposed adjacent to the second wheel 80 and attached to the connector 64 for measuring the angle of the second wheel 80 relative. In addition, the traveling control system 106 includes a distance measuring sensor 110 disposed adjacent to the second wheel 80 and attached to the second mounting member 84 for measuring the gap G between the frame 30 and the barrier 28. The traveling control system 106 includes a plurality of electromagnetic valves 112 connected to the cylinder 98 for allowing fluid flow from the hydraulic power unit 104 to the cylinder 98 for steering the second wheel 80. The traveling control system 108 further includes a programmable logic controller 114 (PLC 114), electrically connected to the engine 102, the electromagnetic valves 112, the cylinder 98, the angle sensor 108, the hydraulic power unit 104, and the distance measuring sensor 110. The PLC 114 is configured to receive information obtained from the angle sensor 108 and the distance measuring sensor 110 and control the engine 102, the hydraulic power unit 104, the electromagnetic valves 112, and the cylinder 98 in response to information received from the angle sensor 108 and the distance measuring sensor 110 for steering the frame 30.

In operation, when the traveling control system 106 is initiated, the distance measuring sensor 110 of the traveling control system 106 first measures the gap G between the frame 30 and the barriers 28 to determine a central line C between the barriers 28. Next, as the tire trolley assembly 20 travels along the road 24 or the precast beam 28, the gap G between the frame 20 and the barrier 28 are constantly measured by the distance measuring sensor 110 to determine the direction of travel of the tire trolley assembly 20 in comparison with the central line C. The traveling control system 106 has a predetermined a nominal distance, an alarming distance, and a maximum distance stored therein. The nominal, alarming, and maximum distances indicate the amount of offset distance, e.g. a deviation, between the line of travel L of the frame 30 and the central line C. In response to the deviation being less than the nominal distance, the tire trolley assembly 20 travels without any steering. In response to the deviation being greater than or equal to the nominal distance but less than the alarming distance, the tire trolley assembly 20 continues to travel while the electromagnetic valves 112 are energized to allow the cylinder 98 to adjust the second wheel 80 to steer the tire trolley assembly 20 to a position with the deviation being less than the nominal distance. In response to the deviation being equal to or greater than the alarming distance but less than the maximum distance, the tire trolley assembly 20 continues to travel and the cylinder 98 continues to adjust the second wheel 80 to steer the tire trolley assembly 20 to the position with the deviation being less than the nominal distance. At this time, the indicator lights 74 and the speakers 76 may also sound to alert the operator of the situation. In response to the deviation being equal to or greater than the maximum distance, operation of the tire trolley assembly 20 stops immediately. At the same time, the indicator lights 74 and the speakers 76 may also sound to alert the operator and the tire trolley assembly's 20 surroundings of the situation.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A tire trolley assembly for transporting a precast beam of a bridge along a road including a barrier extending along both sides of the road, the tire trolley assembly comprising:

a frame including a pair of supports having a first support and a second support each extending between a first end and a second end for receiving and transporting the precast beam;

a connector disposed at said first end and said second end and attached to said support and extending between a primary end and a secondary end with said primary end being adjacent to said frame and said secondary end being spaced from said frame;

a plurality of wheels including a first wheel and a second wheel attached to said connector with said first wheel being attached to said primary end and said second wheel being attached to said secondary end for movement along a surface;

a plurality of mounting members including a first mounting member and a second mounting member with said first mount member being rotatably attached to said first wheel and coupled to said connector and said second mounting member being rotatably attached to said second wheel and coupled to said connector;

a cylinder attached to said connector and at least one of said mounting member for rotating said mounting member about said connector to steer said frame; and a traveling control system for monitoring a gap between said frame and the barrier of the road to determine a central line and a line of travel of said frame and a deviation between said central line and said line of travel with said traveling control system defining a nominal distance and an alarming distance and a maximum distance whereby:

a) in response to said deviation being less than said nominal distance, the tire trolley assembly travels without any steering;

b) in response to said deviation being greater than or equal to said nominal distance but less than said alarming distance, the tire trolley assembly travels and said cylinder adjusts said wheels to steer the tire trolley assembly to a position with said deviation being less than said nominal distance;

c) in response to said deviation being equal to or greater than said alarming distance but less than said maximum distance, the tire trolley assembly travels and said cylinder adjusts said wheels to steer the tire trolley assembly to said position with said deviation being less than said nominal distance; and d) in response to said deviation being equal to or greater than said maximum distance, operation of the tire trolley assembly stops immediately.

2. The tire trolley assembly as set forth in claim 1 wherein said traveling control system including a distance measuring sensor disposed on adjacent to said second wheel and attached to said mounting member for measuring said gap between said frame and the barrier.

3. The tire trolley assembly as set forth in claim 2 wherein said traveling control system including an angle sensor disposed adjacent to said second wheel and attached to said secondary end of said connector for measuring angle of said second wheel relative to said connector.

4. The tire trolley assembly as set forth in claim 3 wherein said traveling control system includes a plurality of electromagnetic valves connected to said wheels and said cylinder for steering said wheels.

5. The tire trolley assembly as set forth in claim 4 wherein said traveling control system includes a programmable logic controller electrically connected to said electromagnetic valves and said cylinder and said angle sensor and said distance measuring sensor and configured to receive information obtained from said angle sensor and said distance measuring sensor and to control said electromagnetic valves and said cylinder in response to the information from said angle sensor and said distance measuring sensor for steering said frame.

6. The tire trolley assembly as set forth in claim 1 wherein said cylinder is disposed between said primary end and said secondary end of said connector and attached to said connector and said second mounting member for rotating said second mounting member and said second wheel relative to said connector to steer said frame.

7. The tire trolley assembly as set forth in claim 1 wherein said cylinder is disposed between said primary end and said secondary end of said connector and attached to said connector and said first mounting member for rotating said first mounting member and said first wheel relative to said connector to steer said frame.

8. The tire trolley assembly as set forth in claim 1 wherein said mounting member includes a body extending between a first body end and second body end with said first body end being disposed adjacent to said connector and said second body end being disposed adjacent to said wheels.

9. The tire trolley assembly as set forth in claim 8 further including a leg is disposed at said first body end and extending outwardly from said body toward said wheels.

10. The tire trolley assembly as set forth in claim 8 further including a shaft disposed at said second body end and extending outwardly from said body toward said wheels and extending through said wheels to allow said wheels to rotate about said shaft for transporting the frame and the precast beam.

11. The tire trolley assembly as set forth in claim 9 further including a protrusion extending outwardly from said leg toward said connector and coupled to said connector for allowing said mounting member and said wheel to rotate about said connector to adjust the direction of travel for the tire trolley assembly.

12. The tire trolley assembly as set forth in claim 1 further including a first cabin disposed at said second end of said first support member of said frame and attached said secondary end of said connector to allow an operator to control the tire trolley assembly in said first cabin.

13. The tire trolley assembly as set forth in claim 12 further including a second cabin disposed at said first end of said second support member of said frame and attached to said secondary end of said connector to allow the operator to control the tire trolley assembly in said second cabin.

14. A tire trolley assembly for transporting a precast beam of a bridge along a road including a barrier disposed on both sides of the road, the tire trolley assembly comprising:

a frame for receiving and transporting the precast beam;

said frame including a pair of supports having a first support and a second support each extending between a first end and a second end disposed parallel and spaced from one another;

each of said supports including a base extending between a first base end and a second base end;

a pair of arms spaced from one another extending outwardly to define a chamber extending between said arms and said base for receiving the precast beam;

said pair of arms including a first arm and a second arm with said first arm being connected to said base at said first base end and extending outwardly and upwardly from said first base end at a first angle of greater than 90° relative to said base to a first arm end and said second arm being connected to said base at said second base end and extending outwardly from said second base end at a second angle of greater than 90° relative to said base to a second arm end;

a pair of beams attached to said arms and extending outwardly from said arm in a direction opposite of one another and parallel to said base;

said pair of beams including a first beam and a second beam with said first beam being attached to said first arm end and extending outwardly from said first arm end in a parallel relationship with said base to said first end and said second beam being attached to said second arm end and extending outwardly from said second arm end in a parallel relationship with said base to said second end;

a pair of linking members spaced from one another with one of said linking members being disposed at said first end and another one of said linking members being disposed at said second end of said supports and extending perpendicularly between said supports to connect said supports with one another;

a pair of intermediate members spaced from one another and extending between said base of said supports perpendicular to said base of said supports to connect said frame with one another;

said linking members and said intermediate members being telescopic for adjusting spacing between said supports to accommodate for precast beams having different sizes;

a connector disposed at said first end and said second end of said support and attached to said support and extending parallel to said base between a primary end and a secondary end with said primary end being disposed adjacent to said arms of said support and said secondary end being longitudinally spaced from said frame;

a first cabin disposed at said second end of said first support member of said frame and attached said secondary end of said connector to allow an operator to control the tire trolley assembly in said first cabin;

a second cabin disposed at said first end of said second support member of said frame and attached to said secondary end of said connector to allow the operator to control the tire trolley assembly in said second cabin;

a plurality of wheels attached to said connector for movement along a surface to transport said frame and the precast beam;

said plurality of wheels including a first wheel and a second wheel attached to said connector with said first wheel being attached to said primary end of said connector and said second wheel being attached to said secondary end of said connector;

a plurality of mounting members including a first mounting member and a second mounting member with said first mount member being rotatably attached to said first wheel and coupled to said primary end of said connector and said second mounting member being rotatably attached to said second wheel and coupled to said secondary end;

said mounting member of generally C-shape including a body extending between a first body end and second body end with said first body end being disposed adjacent to said connector and said second body end being disposed adjacent to said wheels;

a leg disposed at said first body end and extending outwardly from said body toward said wheels;

a shaft disposed at said second body end and extending outwardly from said body toward said wheels and extending through said wheels to allow said wheels to rotate about said shaft for transporting the frame and the precast beam;

a protrusion extending outwardly from said leg toward said connector and coupled to said connector for allowing said mounting member and said wheel to rotate about said connector for adjusting the direction of travel for the tire trolley assembly;

a cylinder attached to said connector and said mounting member for rotating said mounting member about said connector to steer said frame;

a casing of generally L-shape in cross-section attached to said frame at said first end and said arm;

an engine disposed on said casing for providing power to said wheels for transporting the preacast beam;

a hydraulic power unit disposed on said casing adjacent to said engine and connect to said cylinder for moving said cylinder to steer said frame; and a traveling control system for monitoring a gap between said frame and the barrier of the road to determine a central line and a line of travel of said frame and a deviation between said central line and said line of travel with said traveling control system defining a nominal distance and an alarming distance and a maximum distance whereby:

a) in response to said deviation being less than said nominal distance, the tire trolley assembly travels without any steering;

b) in response to said deviation being greater than or equal to said nominal distance but less than said alarming distance, the tire trolley assembly travels and said cylinder adjusts said wheels to steer the tire trolley assembly to a position with said deviation being less than said nominal distance;

c) in response to said deviation being equal to or greater than said alarming distance but less than said maximum distance, the tire trolley assembly travels and said cylinder adjusts said wheels to steer the tire trolley assembly to said position with said deviation being less than said nominal distance; and d) in response to said deviation being equal to or greater than said maximum distance, operation of the tire trolley assembly stops immediately;

said traveling control system including an angle sensor disposed adjacent to said second wheel and attached to said secondary end of said connector for measuring angle said second wheel relative to said connector;

said traveling control system including a distance measuring sensor disposed on adjacent to said second wheel and attached to said mounting member for measuring said gap between said frame and the barrier;

said traveling control system including a plurality of electromagnetic valves connected to said wheels and said cylinder for steering said wheels;

said traveling control system including a programmable logic controller electrically connected to said engine and said electromagnetic valves and said cylinder and said angle sensor and said distance measuring sensor and configured to receive information obtained from said angle sensor and said distance measuring sensor and to control said engine and said electromagnetic valves and said cylinder in response to information received from said angle sensor and said distance measuring sensor for steering said frame;

said cylinder being disposed between said primary end and said secondary end of said connector and attached to said connector extending parallel along said connector toward said secondary end and attached to said second mounting member for rotating said second mounting member and said second wheel relative to said connector to steer said frame.

* * * * *